Feb. 13, 1940.  A. T. SMITH  2,190,276

TEMPERATURE CONTROL FOR ELECTRIC COOKING DEVICES

Filed Sept. 7, 1937

INVENTOR
ALVA T. SMITH
BY
ATTORNEYS

Patented Feb. 13, 1940

2,190,276

UNITED STATES PATENT OFFICE 2,190,276

TEMPERATURE CONTROL FOR ELECTRIC COOKING DEVICES

Alva T. Smith, Milwaukee, Wis., assignor to National Enameling and Stamping Company, Milwaukee, Wis.

Application September 7, 1937, Serial No. 162,730

1 Claim. (Cl. 200—138)

This invention appertains to electric cooking devices, such as roasters, and more particularly to a novel temperature control therefor.

In electric roasters, such as the "Nesco" roaster, a manual control knob is provided, which can be set by the operator for the desired heat in the roaster. When this heat is reached the current is automatically cut off and on so that the desired temperature can be maintained. In mass production, irrespective of careful manufacture, it has been found that the temperature may vary from that set by the operator. Thus an operator may set his knob for a 400° heat, and actually the switch may cut off at 380°, or may not cut off until 420° is reached. Thus, all of the heat control devices are not accurate.

One of the primary objects of my invention is to provide a novel and simple means whereby the temperature control devices can be easily and quickly adjusted, after a test, to operate accurately at the dial readings without interfering with the knob or dial at all.

Another salient object of my invention is the provision of means for changing the position of the adjusting screw in or out relative to the thermostat without turning the screw or the operator's knob connected therewith.

With these and other objects in view, the invention consists in the novel construction, arrangement, and formation of parts, as will be hereinafter more specifically described, claimed, and illustrated in the accompanying drawing, in which drawing:

Referring to the drawing in detail, wherein similar reference characters designate corresponding parts throughout the several views, the letter R indicates a roaster or similar electric cooking device having my novel appliance incorporated therewith.

Figure 1:
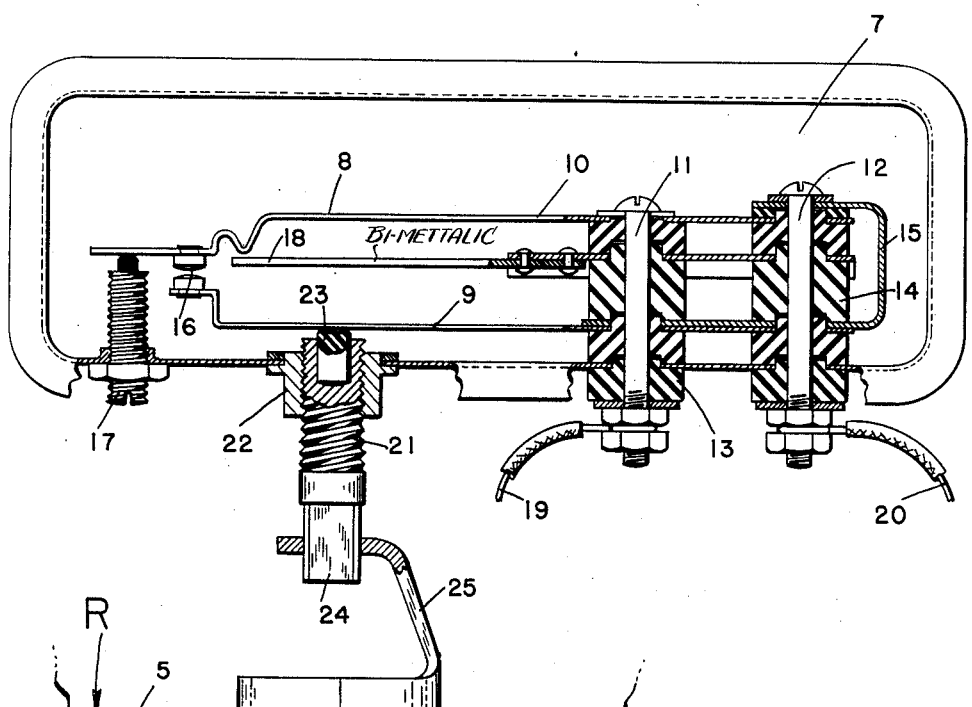
Figure 1 is a fragmentary horizontal section through an electric cooking device, such as a roaster, showing the thermostat control therefor and illustrating my novel means for initially adjusting the position of the operating screw relative to the thermostat.
Figure 3:
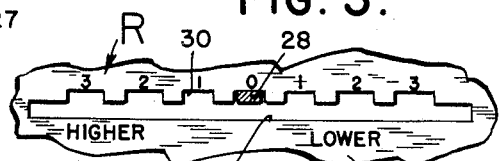
Figure 3 is a fragmentary, bottom plan view of the roaster showing the lever employed for initially adjusting the screw, in section.
Figure 2:
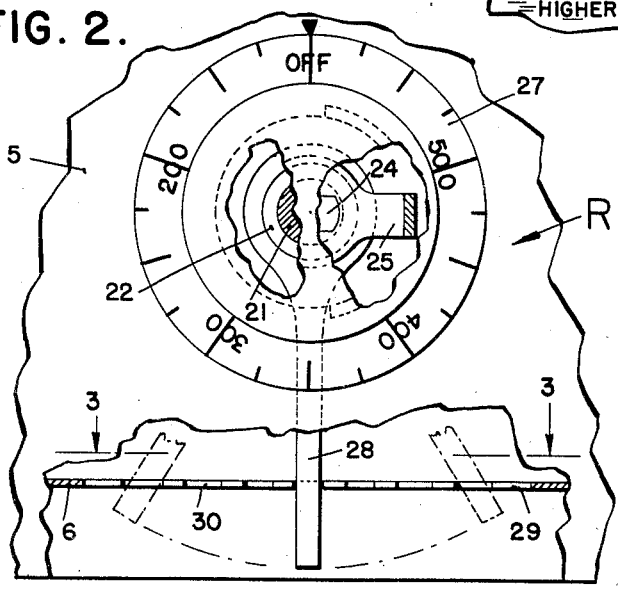
Figure 2 is a fragmentary side elevation of a roaster, with parts thereof broken away and in section, illustrating the novel means employed for initially adjusting the operating screw.

Only a sufficient portion of the roaster has been shown to illustrate the operation of my appliance, and, as shown, the roaster includes the outer roaster shell embodying the side wall 5 and the bottom wall 6. Located within the shell 5 is the casing 7 for the thermostat control 8. The thermostat is located adjacent to the bottom wall of the roaster well (not shown).

The thermostat includes resilient contact fingers 9 and 10. These fingers 9 and 10 are mounted upon posts 11 and 12. The finger 9 is insulated from the post 11 by insulating sleeves 13, and the finger 10 is insulated from the post 12 by sleeves of insulation 14. The finger 10 is in direct electrical contact with the post 11, while the finger 9 is electrically connected with its post 12 by means of a strap 15. The outer ends of the fingers 9 and 10 carry contact points 16, and the point of the finger 10 is normally urged toward the point of the finger 9 by the inherent resiliency of the finger 10. A stop screw 17 is arranged in the path of the finger 10 so as to limit the inward movement thereof.

Arranged between the fingers 9 and 10 is a bimetallic thermostatic arm 18. This arm is carried by, but insulated from, the posts 11 and 12. The outer ends of the posts 11 and 12 receive the electric conducting wires 19 and 20. As the bimetallic arm 18 becomes heated, the same will distort and move against the finger 10, whereby the finger will be carried away from the finger 9.

In order to adjust the contact point of the finger 9 relative to the finger 10, an adjusting or operating screw 21 is provided. This screw has fast threads formed thereon and is fitted in a nut 22 carried by the casing 7. The inner end of the screw carries a knob 23 of insulation for engaging the finger 9, and the outer end of the screw has formed thereon a polygonal head 24.

The polygonal head 24 is slidably but non-rotatably fitted in the operating crank 25 carried by an adjusting sleeve 26. This adjusting sleeve rotatably extends through the side wall 5 of the roaster shell and has secured thereto the operator's knob 27. The knob is suitably graduated, and the graduations cooperate with a dial marking on the wall 5 of the shell.

In accordance with my invention, I rotatably mount the nut 22 on the casing 7 so that said nut can be turned. It is to be noted that while the nut 22 is mounted for turning movement, the same is held firmly against lateral and longitudinal shifting movement.

Rigidly secured to the nut 22 is a depending manipulating lever 28, and this lever extends through a slot 29 formed in the lower wall 6 of the roaster shell. One wall of the slot is provided with a plurality of notches 30, and the lever 28 is adapted to be snapped into any selected notch. These notches can be suitably numbered, and the center notch marks the normal position of the lever, but the lever can be shifted to the right or to the left.

In operation of my appliance, the roaster with the thermostat control is assembled in the ordinary manner, with the lever 28 in the center notch. If it is found upon the testing of the roaster that the thermostat cuts off too fast or too slow, the lever 28 is moved either to the right or to the left, as the case may be. This will rotate the nut 22, and the adjusting screw 21 will be moved longitudinally and shifted with the crank 25.

This adjustment of the screw will shift the position of the finger 9 relative to the finger 10, and thus the fingers can be initially and accurately set so that the thermostat will operate according to the dial readings.

Changes in details may be made without departing from the spirit or the scope of my invention, but what I claim as new is:

In an electric heating device, a thermostat control therefor including a pair of resilient fingers having contact points, a casing for said fingers, a nut rotatably carried by the casing and held against longitudinal movement, an adjusting screw fitted in the nut movable toward and away from one of the fingers for adjusting the finger relative to the other, an actuating knob located exteriorly of the casing for rotating the screw, said knob having a slidable connection with the screw, a radially extending operating lever connected with the nut projecting a considerable distance beyond the casing, whereby the lever can be grasped by the fingers of an operator for turning the nut on the casing whereby primary adjustment of the screw can be had without turning or disturbing the position of the knob, and means for holding the lever and, consequently, the nut in an adjusted position against movement.

ALVA T. SMITH.